(12) United States Patent
Pelliconi et al.

(10) Patent No.: US 8,039,540 B2
(45) Date of Patent: Oct. 18, 2011

(54) POLYOLEFIN COMPOSITION HAVING A HIGH BALANCE OF STIFFNESS, IMPACT STRENGTH AND ELONGATION AT BREAK AND LOW THERMAL SHRINKAGE

(75) Inventors: Anteo Pelliconi, Rovigo (IT); Enea Garagnani, Ferrara (IT)

(73) Assignee: Basell Poliolefine Italia s.r.l., Milan (IL)

( * ) Notice: Subject to any disclaimer, the term of this patent is extended or adjusted under 35 U.S.C. 154(b) by 918 days.

(21) Appl. No.: 11/628,628

(22) PCT Filed: May 30, 2005

(86) PCT No.: PCT/EP2005/005881
§ 371 (c)(1), (2), (4) Date: Dec. 5, 2006

(87) PCT Pub. No.: WO2005/121240
PCT Pub. Date: Dec. 22, 2005

(65) Prior Publication Data
US 2008/0071019 A1 Mar. 20, 2008

Related U.S. Application Data

(60) Provisional application No. 60/590,661, filed on Jul. 23, 2004.

(30) Foreign Application Priority Data

Jun. 8, 2004 (EP) ..................... 04013522

(51) Int. Cl.
*C08K 3/34* (2006.01)
*C08K 5/00* (2006.01)
*C08L 33/00* (2006.01)
*C08L 23/10* (2006.01)

(52) U.S. Cl. ......... 524/515; 524/536; 524/522; 524/451

(58) Field of Classification Search .................. 524/451, 524/515, 522, 536
See application file for complete search history.

(56) References Cited

U.S. PATENT DOCUMENTS

| | | |
|---|---|---|
| 3,515,775 A | 6/1970 | Combs et al. |
| 4,128,606 A | 12/1978 | Furutachi et al. |
| 4,143,099 A | 3/1979 | Duncan |
| 4,220,579 A | 9/1980 | Rinehart |
| 4,298,718 A | 11/1981 | Mayr et al. |
| 4,313,867 A | 2/1982 | Duvdevani |
| 4,316,966 A | 2/1982 | Mineshima et al. |
| 4,399,054 A | 8/1983 | Ferraris et al. |
| 4,480,065 A | 10/1984 | Kawai et al. |
| 4,495,338 A | 1/1985 | Mayr et al. |
| 4,705,818 A | 11/1987 | Kawai et al. |
| 4,734,459 A | 3/1988 | Cecchin et al. |
| 4,857,613 A | 8/1989 | Zolk et al. |
| 4,871,796 A | 10/1989 | Komatsu et al. |
| 5,055,528 A | 10/1991 | Kioka et al. |
| 5,145,819 A | 9/1992 | Winter et al. |
| 5,155,030 A | 10/1992 | Nakamura et al. |
| 5,239,022 A | 8/1993 | Winter et al. |
| 5,243,001 A | 9/1993 | Winter et al. |
| 5,288,824 A | 2/1994 | Kerth et al. |
| 5,324,800 A | 6/1994 | Welborn, Jr. et al. |
| 5,391,618 A | 2/1995 | Yamamoto et al. |
| 5,480,972 A | 1/1996 | Avjioglu et al. |
| 5,536,789 A | 7/1996 | Schwager et al. |
| 5,541,260 A | 7/1996 | Pelliconi et al. |
| 5,556,928 A | 9/1996 | Devore et al. |
| 5,747,592 A | 5/1998 | Huff et al. |
| 5,763,534 A | 6/1998 | Srinivasan et al. |
| 5,824,400 A | 10/1998 | Petrakis et al. |
| 6,054,406 A | 4/2000 | Smith |
| 6,191,223 B1 | 2/2001 | Dolle et al. |
| 6,214,934 B1 * | 4/2001 | Moriya et al. .................. 525/89 |

(Continued)

FOREIGN PATENT DOCUMENTS

DE 3319619 11/1983

(Continued)

OTHER PUBLICATIONS

J. Wolters, "Polyolefin-Elastomere; Moderne Katalysatoretchnik steht Pate fur Thermoplaste mit Kautscuk-Eigenschaften," *Kuntstoffe*, vol. 84, p. 446-450 (1994).

M. Kakugo et al., "$^{13}$C NMR Determination of Monomer Sequence Distribution in Ethylene Propylene Copolymers Prepared withδ-TiCl$_3$-Al(C$_2$H$_5$)$_2$Cl," *Macromolecules*, vol. 15(4), p. 1150-1152 (1982).

J. Randall, "A Review of High Resolution Liquid$^{13}$Carbon Nuclear Magnetic Resonance Characterizations of EthyleneBased Polymers," *JMS-Rev. Macromol. Chem. Phys*, C29(2&3), p. 201-317 (1989).

(Continued)

*Primary Examiner* — Karuna P Reddy
(74) *Attorney, Agent, or Firm* — Dilworth IP, LLC

(57) ABSTRACT

Polymer composition showing an improved balance of flexural modulus, IZOD impact strength and elongation at break comprising (percent by weight): A) a polymer blend comprising: A1) 50-70% of a crystalline propylene homopolymer or copolymer; and A2) 30-50% of one or more copolymer(s) of ethylene with one or more C$_4$-C$_{10}$ α-olefin(s) containing from 15 to 35% of said C$_4$-C$_{10}$ α-olefin(s); said polymer blend (A) having values of MFR equal to or higher than 10 g/10 min., a total content C$_4$-C$_{10}$ α-olefin(s) equal to or higher than 8% and an intrinsic viscosity value of the fraction soluble in xylene at room temperature of from 1.3 to 2 dl/g, the amounts of (A1) and (A2) being referred to the total weight of the polymer blend; and optionally B) 1-15% of an elastomeric polymer different from A2), having a hardness (Shore A, ASTM D-2240) value equal to or lower than 90 points; and/or C) 0.5-20% of a mineral filler; the amounts of optional components (B) and (C) being referred to the total weight of the composition.

10 Claims, No Drawings

U.S. PATENT DOCUMENTS

| | | |
|---|---|---|
| 6,395,832 B1 | 5/2002 | Pelliconi et al. |
| 6,429,250 B1 | 8/2002 | Rohrmann |
| 6,953,829 B2 | 10/2005 | Kratzer et al. |
| 7,101,940 B2 | 9/2006 | Schottek et al. |
| 7,122,606 B2 | 10/2006 | Tonti et al. |
| 2004/0010087 A1 | 1/2004 | Obata et al. |
| 2005/0272874 A1* | 12/2005 | Pelliconi et al. ............ 525/240 |
| 2006/0041072 A1* | 2/2006 | Pelliconi et al. ............ 525/240 |
| 2006/0047071 A1* | 3/2006 | Pelliconi et al. ............ 525/191 |
| 2006/0235139 A1* | 10/2006 | Garagnani et al. ........... 524/515 |
| 2007/0078224 A1 | 4/2007 | Dominic et al. |

FOREIGN PATENT DOCUMENTS

| | | |
|---|---|---|
| DE | 4019053 | 12/1991 |
| DE | 4211413 | 10/1993 |
| DE | 19962814 | 6/2001 |
| DE | 19962910 | 7/2001 |
| EP | 9276 | 4/1980 |
| EP | 45975 | 2/1982 |
| EP | 45977 | 2/1982 |
| EP | 86473 | 8/1983 |
| EP | 129368 | 12/1984 |
| EP | 170255 | 2/1986 |
| EP | 323715 | 7/1989 |
| EP | 353981 | 2/1990 |
| EP | 361493 | 4/1990 |
| EP | 361494 | 4/1990 |
| EP | 362705 | 4/1990 |
| EP | 373660 | 6/1990 |
| EP | 395083 | 10/1990 |
| EP | 416815 | 3/1991 |
| EP | 420436 | 4/1991 |
| EP | 430490 | 6/1991 |
| EP | 451645 | 10/1991 |
| EP | 457082 | 11/1991 |
| EP | 463406 | 1/1992 |
| EP | 472946 | 3/1992 |
| EP | 476625 | 3/1992 |
| EP | 485820 | 5/1992 |
| EP | 485822 | 5/1992 |
| EP | 485823 | 5/1992 |
| EP | 496926 | 8/1992 |
| EP | 519725 | 12/1992 |
| EP | 553805 | 8/1993 |
| EP | 553806 | 8/1993 |
| EP | 573862 | 12/1993 |
| EP | 600246 | 6/1994 |
| EP | 602512 | 6/1994 |
| EP | 611801 | 8/1994 |
| EP | 633289 | 1/1995 |
| EP | 643066 | 3/1995 |
| EP | 671404 | 9/1995 |
| EP | 674991 | 10/1995 |
| EP | 692499 | 1/1996 |
| EP | 728769 | 8/1996 |
| EP | 782587 | 7/1997 |
| EP | 790076 | 8/1997 |
| EP | 792814 | 9/1997 |
| EP | 816395 | 1/1998 |
| EP | 831125 | 3/1998 |
| EP | 844279 | 5/1998 |
| EP | 844280 | 5/1998 |
| EP | 844281 | 5/1998 |
| EP | 936247 | 8/1999 |
| EP | 936248 | 8/1999 |
| EP | 1236769 | 9/2002 |
| JP | 01016848 | 1/1989 |
| JP | 11209532 | 8/1999 |
| WO | 91/02012 | 2/1991 |
| WO | 91/04257 | 4/1991 |
| WO | 92/00333 | 1/1992 |
| WO | 92/22607 | 12/1992 |
| WO | 96/22327 | 7/1996 |
| WO | 96/22995 | 8/1996 |
| WO | 98/22486 | 5/1998 |
| WO | 98/37144 | 8/1998 |
| WO | 99/21899 | 5/1999 |
| WO | 99/24446 | 5/1999 |
| WO | 99/58539 | 11/1999 |
| WO | 00/26295 | 5/2000 |
| WO | 01/19915 | 3/2001 |
| WO | 01/21674 | 3/2001 |
| WO | 01/44318 | 6/2001 |
| WO | 01/47939 | 7/2001 |
| WO | 01/48034 | 7/2001 |
| WO | 01/62764 | 8/2001 |
| WO | 03/045964 | 6/2003 |
| WO | 03/051984 | 6/2003 |
| WO | 2004/003072 | 1/2004 |
| WO | 2004/003073 | 1/2004 |
| WO | 2005/014715 | 2/2005 |
| WO | 2005/044911 | 5/2005 |

OTHER PUBLICATIONS

J. Randall, "3,4 Monomer Distributions and Number-Average Sequence Lengths in Ehtylene Propylene Copolymers," *Polymer Sequence Determination; Carbon-13 NMR Method*, p. 53-58 (1977).

* cited by examiner

POLYOLEFIN COMPOSITION HAVING A HIGH BALANCE OF STIFFNESS, IMPACT STRENGTH AND ELONGATION AT BREAK AND LOW THERMAL SHRINKAGE

The present invention relates to an impact resistant thermoplastic polyolefin composition. In particular, the present invention relates to a composition containing a propylene polymer component and one or more copolymer(s) of ethylene with $C_4$-$C_{10}$ α-olefins, showing an improved balance of flexural modulus, IZOD impact strength and elongation at break.

In addition to the said properties, the composition of the present invention presents a low degree of thermal shrinkage. Said property imparts a high dimensional stability to the final articles obtained from the said composition.

Thus, due to its mechanical and physical properties, the polyolefin composition of the present invention finds application above all in the automotive field (e.g. bumpers and side strips).

In WO00/26295 polyolefin compositions with low values of coefficient of linear thermal expansion and good mechanical properties are described, comprising (by weight) from 40 to 60% of a broad molecular weight distribution propylene polymer having a polydispersity index from 5 to 15 and melt flow rate of from 80 to 200 g/10 min (according to ASTM-D 1238, condition L), and from 40 to 60% of a partially xylene-soluble olefin polymer rubber containing at least 65% by weight of ethylene, the $IV_S/IV_A$ ratio between the intrinsic viscosity ($IV_S$) of the portion soluble in xylene of the polyolefin composition at room temperature and the intrinsic viscosity ($IV_A$) of the said propylene polymer ranging from 2 to 2.5.

These compositions typically have a flexural modulus of from 650 to 1000 MPa.

In European patent application No. 03018013, corresponding to U.S. provisional application No. 60/496,579, polyolefin compositions having flexural modulus values of higher than 1000 MPa, in particular higher than 1100 MPa, still maintaining a good balance of overall mechanical properties and low values of thermal shrinkage are described, comprising (percentage by weight):

(A) from 60 to 85% of a broad molecular weight distribution propylene polymer having a polydispersity index from 5 to 15 and melt flow rate of from 20 to 78 g/10 min, and (B) from 15 to 40% of a partially xylene-soluble olefin polymer rubber containing at least 65% by weight of ethylene.

It has now been found that by selecting specific propylene polymers and ethylene/α-olefin(s) copolymers, in combination with other features relating to the composition and the proportions of the various components, it is possible to obtain a polymer composition characterized in particular by high flexural modulus values, with very low values of thermal shrinkage.

Thus the present invention relates to a composition comprising (percent by weight):

A) a polymer blend comprising:
   A1) 50-70%, preferably 50-65%, more preferably 52-65% of a crystalline propylene homopolymer or copolymer containing up to 5% of ethylene and/or $C_4$-$C_{10}$ α-olefin(s), said homopolymer or copolymer having a value of MFR (230° C., 2.16 kg) of from 50 to 200 g/10 min., preferably from 55 to 180 g/10 min., in particular from 100 to 180 g/10 min., and a content of fraction soluble in xylene at room temperature (around 25° C.) of 7% or less; and A2) 30-50%, preferably 35-50%, more preferably 35-48% of one or more copolymer(s) of ethylene with one or more $C_4$-$C_{10}$ α-olefin(s) containing from 15 to 35%, preferably from 20 to 30% of said $C_4$-$C_{10}$ α-olefin(s);

said polymer blend (A) having values of MFR equal to or higher than 10 g/10 min., preferably equal to or higher than 15 g/10 min., a total content $C_4$-$C_{10}$ α-olefin(s) equal to or higher than 7%, preferably equal to or higher than 8%, in particular of from 8% to 15%, more preferably from 8% to 14%, in particular from 9% to 14%, and an intrinsic viscosity value of the fraction soluble in xylene at room temperature of from 1.3 to 2 dl/g, preferably from 1.5 to 2 dl/g, the amounts of (A1) and (A2) being referred to the total weight of the polymer blend; and optionally B) 1-15%, preferably 2-10%, of an elastomeric polymer different from A2), having a hardness (Shore A, ASTM D-2240) value equal to or lower than 90 points, preferably equal to or lower than 88 points, more preferably equal to or lower than 80 points; and/or C) 0.5-20%, preferably 0.5-10% of a mineral filler;

the amounts of optional components (B) and (C) being referred to the total weight of the composition.

From the above definitions it is evident that, when the composition of the present invention comprises the optional component (B) only, the amount of (A) is from 99 to 85%, preferably from 98 to 90%; when it comprises the optional component (C) only, the amount of (A) is from 99.5 to 80%, preferably from 99.5 to 90%; when it comprises both (B) and (C), the amount of (A) is from 98.5 to 65%, preferably from 97.5 to 80%.

It is also evident that the term "copolymer" includes polymers containing more than one kind of comonomers.

As previously mentioned, the compositions of the present invention can be easily converted into various kinds of finished or semi-finished articles, in particular by using injection-molding techniques, as they possess relatively high values of MFR, associated with the said high balance of properties (in particular, of flexural modulus, impact resistance, elongation at break and shrinkage).

Other preferred features for the compositions of the present invention are:

a total content of ethylene from 25% to 35% by weight;
a flexural modulus from 700 to 1200 MPa;
a value of Izod at 23° C. from 60 KJ/$m^2$ to "No Break";
shrinkage from 0.4 to 1.2%;
fraction soluble in xylene at room temperature: 40% by weight or less, more preferably 35% by weight or less.

The ductile/brittle transition temperature of the polymer blend (A) is generally equal to or lower than −30° C., preferably lower than −40° C.

The compositions of the present invention have preferably a MFR value of 10 g/10 min. or higher, or even of 25 g/10 min. or higher, for example in the range from 10 to 60 g/10 min., in particular from 25 to 60 g/10 min.

The amount of component (A1) which is soluble in xylene at room temperature is, as previously said, equal to or lower than 7%, preferably equal to or lower than 5% by weight. Such values of xylene-soluble content correspond to isotactic index values equal to or higher than 93%, preferably equal to or higher than 95%.

Typically the component (A2) is partially soluble in xylene at room temperature. The content of fraction of component (A2) which is soluble in xylene at room temperature is preferably of about 50-87% by weight, more preferably 60-80% by weight.

Illustrative $C_4$-$C_{10}$ α-olefins for components (A1) and (A2) include 1-butene, 1-pentene, 1-hexene, 4-methyl-1-pentene and 1-octene, with 1-butene being particularly preferred.

The composition of the present invention can be prepared by mechanically mixing components (B) and (C), when present, with the polymer blend (A). Such polymer blend (A) can in turn be prepared by a sequential polymerization, comprising at least two sequential steps, wherein components (A1) and (A2) are prepared in separate subsequent steps, operating in each step, except the first step, in the presence of the polymer formed and the catalyst used in the preceding step. The catalyst is added only in the first step, however its activity is such that it is still active for all the subsequent steps.

The polymerization, which can be continuous or batch, is carried out following known techniques and operating in liquid phase, in the presence or not of inert diluent, or in gas phase, or by mixed liquid-gas techniques. It is preferable to carry out the polymerization in gas phase.

Reaction time, pressure and temperature relative to the polymerization steps are not critical, however it is best if the temperature is from 50 to 100° C. The pressure can be atmospheric or higher.

The regulation of the molecular weight is carried out by using known regulators, hydrogen in particular.

The polymer blend (A) can also be produced by a gas-phase polymerisation process carried out in at least two interconnected polymerisation zones. The said type of process is illustrated in European patent application 782 587.

In detail, the above-mentioned process comprises feeding one or more monomer(s) to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example between 50 to 120° C.

This process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The said polymerizations are preferably carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an isotactic index equal to or greater than 93%, preferably equal to or greater than 95%. Catalysts having the above mentioned characteristics are well known in the patent literature; particularly advantageous are the catalysts described in U.S. Pat. No. 4,399,054 and European patent 45977.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are phthalic acid esters, such as diisobutyl, dioctyl, diphenyl and benzylbutyl phthalate.

Other electron-donors particularly suitable are 1,3-diethers of formula:

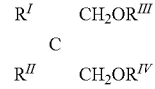

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Representative examples of said dieters are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl) fluorene.

The preparation of the above mentioned catalyst components is carried out according to various methods.

For example, a MgCl$_2$·nROH adduct (in particular in the form of spheroidal particles) wherein n is generally from 1 to 3 and ROH is ethanol, butanol or isobutanol, is reacted with an excess of TiCl$_4$ containing the electron-donor compound. The reaction temperature is generally from 80 to 120° C. The solid is then isolated and reacted once more with TiCl$_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or SO$_4$ or SO$_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$Si(OCH$_3$)$_2$, (cyclohexyl)(methyl)Si (OCH3)$_2$, (phenyl)$_2$Si(OCH$_3$)$_2$ and (cyclopentyl)$_2$Si(OCH$_3$)$_2$. 1,3-diethers having the formulae described above can also be used advantageously. If the internal donor is one of these dieters, the external donors can be omitted.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the component (A2).

The catalysts can be pre-contacted with small amounts of olefins (prepolymerization).

Component (B) is preferably selected from the group consisting of:

1 copolymers of ethylene with a C$_3$-C$_{10}$ α-olefin containing at least 20 wt %, preferably from 20 to 70 wt %, of C$_3$-C$_{10}$ α-olefin (13C-NMR analysis);

2 ethylene-methyl acrylate copolymers containing from 15 to 30 wt % of methyl acrylate units and having MFR from 1 to 10 g/10 min (ASTM D-1238);

3 saturated or unsaturated styrene block copolymers, linear or branched, containing at least one comonomer selected from butadiene, butylene, ethylene and isoprene;

4. ethylene/α-olefin/diene terpolymers, in particular ethylene-propylene-diene monomer rubbers (EPDM);

5. Ethylene/vinyl acetate copolymers containing from 20% to 60% by weight of vinyl acetate and having MFR at 190° C./21.2N (ISO 1133) of 1 g/10 min or more, preferably from 2 to 30 g/10 min.

Preferred examples of elastomeric polymers 1 are:
(a) elastomeric copolymers of ethylene with 1-octene having from 20 wt % to 45 wt % of 1-octene (13C-NMR analysis); preferably having density of less than 0.89 g/ml (measured according to ASTM D-792);
(b) elastomeric thermoplastic copolymers of ethylene with 1-butene having from 20 wt % to 40 wt % of 1-butene (13C-NMR analysis); preferably having density of less than 0.89 g/ml.

Preferred examples of elastomeric copolymers 2 are:
(c) ethylene-methyl acrylate copolymers containing about 20-25 wt % of methyl acrylate units and having MFR form 1.5 to 6 g/10 min.

Preferred examples of elastomeric copolymers 3 are:
(d) unsaturated linear block copolymers of styrene with isoprene or butadiene and saturated linear block copolymers of styrene with ethylene and butylene.

Preferred examples of elastomeric copolymers 4 are:
(e) elastomeric terpolymers of C$_3$-C$_8$ α-olefins containing from 50% to 80% by weight of ethylene and from 1% to 15% by weight of a diene, such as butadiene, 1,4-hexadiene, 1,5-hexadiene and ethylidene-1-norbornene, wherein the α-olefin is preferably propylene; typical density values for these elastomeric terpolymers are of 0.9 g/ml or less.

A specific example of copolymers (a) is a copolymer containing 67 wt % of ethylene and 33 wt % of 1-octene (13C-NMR analysis), having a hardness of 75 Shore A points, a MFR of 11 g/10 min and a density of 0.87 g/ml according to method ASTM D 792.

Another specific example of copolymers (a) is a copolymer containing 75 wt % of ethylene and 25 wt % of 1-octene (IR analysis), having a hardness of 75 Shore A points and a density of 0.87 g/ml according to method ASTM D 792 and MFR of about 1 g/10 min.

A specific example of copolymers (b) is a copolymer containing 77.9 wt % of ethylene and 22.1 wt % of 1-butene (13C-NMR analysis, see note 2 below), having a hardness of 85 Shore A points and a density of 0.87 g/ml according to method ASTM D 792.

A specific example of copolymers (c) is an ethylene-methyl acrylate copolymer containing 20 wt % of methyl acrylate, having a MFR of 1.5-2.5 g/10 min, a hardness of 89 Shore A points and a density of 0.945 g/ml according to method ASTM D 792.

Specific examples of copolymers (d) are styrene-isoprene-styrene block copolymers (SIS), commercialised as Kraton D-1112, having a hardness of 34 Shore A points; styrene-ethylene-butylene-styrene block copolymers (SEBS), marketed as Kraton G-1652, having a hardness of 75 Shore A points; and styrene-ethylene-butylene-styrene block copolymers (SEBS), marketed as Kraton G-1657, having a hardness of 65 Shore A points. They all are commercialised by Shell.

Mineral fillers (C) used in the composition of the present invention include talc, CaCO$_3$, silica, wollastonite (CaSiO$_3$), clays, diatomaceaous earth, titanium oxide and zeolites. Talc is preferred. Typically the mineral filler is in particle form having an average diameter ranging form 0.1 to 5 micrometers.

The composition of the present invention can also contain additives commonly employed in the art, such as antioxidants, light stabilizers, heat stabilizers and colorants.

As previously said, the compositions of the present invention can be prepared by blending the components (A), (B) and (C). Any mixing apparatus equipped with mixing elements and known in the art can be used, such as an internal mixer or extruder. For example one can use a Banbury mixer or single-screw Buss extruder or twin-screw Maris or Werner type extruder.

The present invention also provides final articles, such as bumpers and fascia, made of the said polyolefin composition.

The practice and advantages of the present invention are disclosed below in the following examples. These Examples are illustrative only, and are not intended to limit the scope of the invention in any manner whatsoever.

The following analytical methods are used to characterize the polymer compositions.

Melt Flow Rate: ASTM-D 1238, condition L.

[η] intrinsic viscosity: determined in tetrahydronaphtalene at 135° C.

Ethylene and butene content: I.R. Spectroscopy.
Flexural Modulus: ISO 178.
Tensile strength at yield: ISO 527.
Tensile strength at break: ISO 527.
Elongation at break and at yield: ISO 527.
Notched IZOD impact test: ISO 180/1A
The IZOD values are measured at 23° C. and −30° C.
Xylene Soluble and Insoluble Fractions 2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Longitudinal and Transversal Thermal Shrinkage

A plaque of 100×200×2.5 mm is moulded in an injection moulding machine "SANDRETTO serie 7 190" (where 190 stands for 190 tons of clamping force).

The injection conditions are:
melt temperature=250° C.;
mould temperature=40° C.;
injection time=8 seconds;
holding time=22 seconds;
screw diameter=55 mm.

The plaque is measured 48 hours after moulding, through callipers, and the shrinkage is given by:

$$\text{Longitudinal shrinkage} = \frac{200 - \text{read\_value}}{200} \times 100$$

$$\text{Transversal shrinkage} = \frac{100 - \text{read\_value}}{100} \times 100$$

wherein 200 is the length (in mm) of the plaque along the flow direction, measured immediately after moulding;
100 is the length (in mm) of the plaque crosswise the flow direction, measured immediately after moulding;
the read_value is the plaque length in the relevant direction.

Examples 1 and 2

The solid catalyst component used in polymerization is a highly stereospecific Ziegler-Natta catalyst component supported on magnesium chloride, containing about 2.5% by weight of titanium and diisobutylphthalate as internal donor, prepared by analogy with the method described in the examples of European published patent application 674991.

Catalyst System and Prepolymerization Treatment

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 10 and in such quantity that the TEAL/Ti molar ratio be equal to 65.

The catalyst system is then subjected to prepolymerization by maintaining it in suspension in liquid propylene at 20° C. for about 20 minutes before introducing it into the first polymerization reactor.

Polymerization
First Stage

Into a first gas phase polymerization reactor a polypropylene homopolymer (component (A1)) is produced by feeding in a continuous and constant flow the prepolymerized catalyst system, hydrogen (used as molecular weight regulator) and propylene in the gas state.

The polymerization conditions are shown in Table 1.

Second Stage

The polypropylene homopolymer coming from the first reactor is discharged in a continuous flow and, after having been purged of unreacted monomers, is introduced, in a continuous flow, into a subsequent gas phase reactor, together with quantitatively constant flows of hydrogen, ethylene and butene in the gas state.

In the said reactor an ethylene/butene copolymer (component (A2)) is produced. Polymerization conditions, molar ratio of the reactants and composition of the copolymers obtained are shown in Table 1.

The polymer particles exiting the last reactor are subjected to a steam treatment to remove the reactive monomers and volatile substances, and then dried.

Then the polymer particles are introduced in a rotating drum, where they are mixed with 0.05% by weight of paraffin oil ROL/OB 30 (having a density of 0.842 kg/l at 20° C. according to ASTM D 1298 and flowing point of −10° C. according to ASTM D 97), 0.15% by weight of Irganox® B 215 (made of about 34% Irganox® 1010 and 66% Irgafos® 168) and 0.04% by weight of DHT-4A (hydrotalcite).

The said Irganox 1010 is 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzenepropanoate, while Irgafos 168 is tris(2,4-di-tert.-butylphenyl) phosphite.

Then, the polymer particles are extruded under nitrogen in a screw extruder with a melt temperature of 200-250° C.

The characteristics relating to the polymer compositions, reported in Table II, are obtained from measurements carried out on the so extruded polymer.

TABLE I

| | EXAMPLE | |
|---|---|---|
| | 1 | 2 |
| 1° STAGE (component (A1)) | | |
| Temperature (° C.) | 80 | 80 |
| Amount produced (wt %) | 60.5 | 60.5 |
| MFR L (g/10 min.) | 158 | 63.7 |
| Xylene soluble (wt %) | 2.2 | 1.9 |

TABLE I-continued

|  | EXAMPLE | |
|---|---|---|
|  | 1 | 2 |
| 2° STAGE (component (A2)) | | |
| Temperature (° C.) | 70 | 70 |
| Amount produced (wt %) | 39.5 | 39.5 |
| C4/(C2 + C4) mol | 0.54 | 0.43 |
| C4 in (A2) (wt %) | 26.5 | 21 |
| Xylene soluble in (A2) (wt %) | 71 | 53 |

Notes:
C2 = ethylene; C4 = butene

TABLE II

|  | EXAMPLE | |
|---|---|---|
|  | 1 | 2 |
| MFR L (g/10 min) | 29.5 | 18.7 |
| Xylene soluble (wt %) | 28.2 | 21.3 |
| Ethylene content (wt %) | 29 | 31.2 |
| Butene content (wt %) | 10.6 | 8.3 |
| IVS (dl/g) | 1.77 | 1.75 |
| Flexural modulus (MPa) | 840 | 950 |
| Tensile strength at yield (MPa) | 16.2 | 19.4 |
| Elongation at yield (%) | 12 | 12.7 |
| Tensile strength at break (MPa) | 12.8 | 16.4 |
| Elongation at break (%) | 280 | 640 |
| IZOD resilience at 23° C. (KJ/m$^2$) | N.B | N.B. |
| IZOD resilience at −30° C. (KJ/m$^2$) | 8.7 | 6.1 |
| Longitudinal shrinkage (%) | 0.81 | 0.72 |
| Transversal shrinkage (%) | 1.02 | 0.92 |

Notes:
IVS = Intrinsic Viscosity of xylene soluble fraction; N.B. = No Break.

Examples 3 and 4

The polymer compositions prepared in Examples 1 and 2, hereinafter called compositions (A), are mechanically mixed with components (B) and (C) by extrusion under the previously described conditions, in the proportions reported in Table III. The properties of the so obtained final compositions are reported in Table III.

Added Components
1 Engage 8200: copolymer containing 67 wt % of ethylene and 33% by weight of 1-octene (NMR analysis), having a hardness of 75 Shore A points and a density of 0.87 g/ml, marketed by Dow Chemical, used as component (B);
2 Fabi talc HTP ultra 5c: micronized talc powder with average particle size (diameter) of about 0.5 gm, used as component (C);
3 HM05 talc: fine talc powder with average particle size of about 2 μm, used as component (C);
4 Irganox® B 225: made of about 50% Irganox® 1010 and 50% Irgafos® 168;
5 Irganox® B 215: see above;
6 CaSt: Ca stearate.

TABLE III

|  | EXAMPLE | |
|---|---|---|
|  | 3 | 4 |
| Composition (A) of EX. No. | 1 | 2 |
| Amount of Composition (A) (wt %) | 89.8 | 98.95 |
| Engage 8200 (wt %) | 4 | — |
| Fabi talc HTP ultra 5c (wt %) | 6 | — |
| HM05 talc (wt %) | — | 0.85 |
| Irganox ® B 225 (wt %) | 0.2 | — |
| Irganox ® B 215 (wt %) | — | 0.15 |
| CaSt (wt %) | — | 0.05 |
| MFR L (g/10 min) | 30 | 16.3 |
| Flexural modulus (MPa) | 1005 | 1014 |
| Tensile strength at yield (MPa) | 16.2 | 19.3 |
| Elongation at yield (% a) | 14 | 12.3 |
| Tensile strength at break (MPa) | — | 15.1 |
| Elongation at break (% a) | 500 | >660 |
| IZOD resilience at 23° C. (KJ/m$^2$) | 45 | N.B. |
| IZOD resilience at −30° C. (KJ/m$^2$) | — | 6.1 |
| Longitudinal shrinkage (%) | 0.54 | 0.83 |
| Transversal shrinkage (%) |  | 0.91 |

The invention claimed is:
1. A polymer composition comprising (percent by weight):
(A) a polymer blend comprising:
   (A1) 50-70% of a crystalline propylene homopolymer or copolymer comprising up to 5% of ethylene and/or at least one $C_4$-$C_{10}$ α-olefin, said homopolymer or copolymer comprising a MFR value (230° C., 2.16 kg) of from 50 to 200 g/10 min. and a content of fraction soluble in xylene at room temperature of 7% or less; and
   (A2) 30-50% of at least one copolymer of ethylene with at least one $C_4$-$C_{10}$ α-olefin, the copolymer of ethylene comprising from 15 to 35% of said $C_4$-$C_{10}$ α-olefin;
said polymer blend (A) comprising a MFR value equal to or higher than 10 g/10 min., a total content of $C_4$-$C_{10}$ α-olefin(s) equal to or higher than 7%, and a fraction soluble in xylene at room temperature comprising an intrinsic viscosity of from 1.3 to 2 dl/g, wherein (A1) and (A2) are a total weight of the polymer blend; and optionally
   (B) 1-15% of an elastomeric polymer different from (A2), comprising a hardness value (Shore A, ASTM D-2240) equal to or lower than 90 points; and/or
   (C) 0.5-20% of a mineral filler;
wherein the amounts of optional components (B) and (C) are based on a total weight of the polymer composition, and the polymer composition comprises a flexural modulus ranging from 700 MPa to 1200 MPa, and an Izod at 23° C. of at least 60 kJ/m$^2$.
2. The polymer composition of claim 1, comprising a MFR value from 10 to 60 g/10 min.
3. The polymer composition of claim 1, wherein component (B) is selected from the group consisting of:
   1) at least one copolymer of ethylene with a $C_3$-$C_{10}$ α-olefin comprising at least 20 wt % of the $C_3$-$C_{10}$ α-olefin;
   2) at least one ethylene-methyl acrylate copolymer comprising from 15 to 30 wt % of methyl acrylate units, and a MFR value from 1 to 10 g/10 min.;
   3) at least one saturated or unsaturated, linear or branched, styrene block copolymer comprising at least one comonomer selected from butadiene, butylene, ethylene, isoprene, and combinations thereof;
   4) at least one ethylene/α-olefin/diene terpolymer;
   5) at least one ethylene/vinyl acetate copolymer comprising from 20% to 60% by weight of vinyl acetate and a MFR value (190° C./21.2N; ISO 1133) equal to or greater than 1 g/10 min; and
   6) mixtures thereof.

4. The polymer composition of claim 1, wherein component (C) is talc.

5. A process for preparing a polymer composition comprising (percent by weight):
   (A) a polymer blend comprising:
      (A1) 50-70% of a crystalline propylene homopolymer or copolymer comprising up to 5% of ethylene and/or at least one $C_4$-$C_{10}$ α-olefin, said homopolymer or copolymer comprising a MFR value (230° C., 2.16 kg) of from 50 to 200 g/10 min. and a content of fraction soluble in xylene at room temperature of 7% or less; and
      (A2) 30-50% of at least one copolymer of ethylene with at least one $C_4$-$C_{10}$ α-olefin, the copolymer of ethylene comprising from 15 to 35% of said $C_4$-$C_{10}$ α-olefin;
   said polymer blend (A) comprising a MFR value equal to or higher than 10 g/10 min., a total content of $C_4$-$C_{10}$ α-olefin(s) equal to or higher than 7%, and a fraction soluble in xylene at room temperature comprising an intrinsic viscosity of from 1.3 to 2 dl/g, wherein (A1) and (A2) are a total weight of the polymer blend; and optionally
   (B) 1-15% of an elastomeric polymer different from (A2), comprising a hardness value (Shore A, ASTM D-2240) equal to or lower than 90 points; and/or
   (C) 0.5-20% of a mineral filler;
   wherein the amounts of optional components (B) and (C) are based on a total weight of the polymer composition, and the polymer composition comprises a flexural modulus ranging from 700 MPa to 1200 MPa, and an Izod at 23° C. of at least 60 kJ/m$^2$;
   the process comprising mechanically mixing, when present, components (B) and (C) with the polymer blend (A), wherein the polymer blend (A) is prepared by a sequential polymerization comprising at least two sequential steps, and wherein components (A1) and (A2) are prepared in separate subsequent steps, wherein in each subsequent step the component formed and catalyst used in each preceding step is present, excluding the first step, operating in each step.

6. An automotive bumper, side strip, or combination thereof comprising a polymer composition comprising (percent by weight):
   (A) a polymer blend comprising:
      (A1) 50-70% of a crystalline propylene homopolymer or copolymer comprising up to 5% of ethylene and/or at least one $C_4$-$C_{10}$ α-olefin, said homopolymer or copolymer comprising a MFR value (230° C., 2.16 kg) of from 50 to 200 g/10 min. and a content of fraction soluble in xylene at room temperature of 7% or less; and
      (A2) 30-50% of at least one copolymer of ethylene with at least one $C_4$-$C_{10}$ α-olefin, the copolymer of ethylene comprising from 15 to 35% of said $C_4$-$C_{10}$ α-olefin;
   said polymer blend (A) comprising a MFR value equal to or higher than 10 g/10 min., a total content of $C_4$-$C_{10}$ α-olefin(s) equal to or higher than 7%, and a fraction soluble in xylene at room temperature comprising an intrinsic viscosity of from 1.3 to 2 dl/g, wherein (A1) and (A2) are a total weight of the polymer blend; and optionally
   (B) 1-15% of an elastomeric polymer different from (A2), comprising a hardness value (Shore A, ASTM D-2240) equal to or lower than 90 points; and/or
   (C) 0.5-20% of a mineral filler;
   wherein the amounts of optional components (B) and (C) are based on a total weight of the polymer composition, and the polymer composition comprises a flexural modulus ranging from 700 MPa to 1200 MPa, and an Izod at 23° C. of at least 60 kJ/m$^2$.

7. The polymer composition of claim 1, wherein the total content of $C_4$-$C_{10}$ α-olefin(s) is equal to or higher than 8% by weight.

8. The polymer composition of claim 1, wherein the total content of $C_4$-$C_{10}$ α-olefin(s) ranges from 8% to 15% by weight.

9. The polymer composition of claim 1, wherein the total content of $C_4$-$C_{10}$ α-olefin(s) ranges from 9% to 14% by weight.

10. The polymer composition of claim 1, wherein the flexural modulus ranges from above 770 MPa to 1200 MPa.

\* \* \* \* \*